EXTRUSION PRESS

Filed March 18, 1968 3 Sheets-Sheet 1

INVENTORS:—
Dietmar Anders & Hans Frolich,
BY
Smith, Michael, Bradford & Gardner,
ATTORNEYS.

Dietmar Anders & Hans Frolich, INVENTORS:—
BY
Smith, Michael, Bradford & Gardiner,
ATTORNEYS.

Dietmar Anders & Hans Frolich INVENTORS:-
BY
Smith, Michael, Bradford & Gardiner,
ATTORNEYS.

United States Patent Office 3,482,279

Patented Dec. 9, 1969

3,482,279
EXTRUSION PRESS

Dietmar Anders and Hans Frolich, Hannover, Germany, assignors to Hermann Berstorff Machinenbau G.m.b.H., Hannover, Germany Filed Mar. 18, 1968, Ser. No. 713,722
Int. Cl. B29c 7/14
U.S. Cl. 18—12 4 Claims

ABSTRACT OF THE DISCLOSURE

The invention relates to a screw extrusion press having at its delivery end a wide extrusion head from which extruded material is delivered into the nip of two contra-rotating calender rollers by which the material is shaped to form a sheet. The press is provided with means within the extrusion head for causing the extruded section emerging from the head to be altered.

BACKGROUND TO INVENTION

It is often necessary, for the various purposes of manufacture, to produce sheets of various widths from one and the same screw extruder. Hitherto, this has been done by cutting the sheets lengthwise to the desired widths, but such methods result in considerable wastage, and are therefore to be depreciated on financial grounds alone.

For this reason, screw extruders having interchangeable extrusion heads of various widths have been proposed. The disadvantage of such is that the need to change over the extrusion head according to the sheet width required leads to stoppages in production for a lengthy period during each change of the extrusion head, which stoppages are unwanted because of the heavy capital investment and running costs. Moreover, the purchase price for a number of extrusion heads is somewhat high.

In order to avoid such expense, an extruder having a wide extrusion head with interchangeable side members has been proposed, which side members can be changed over according to the sheet width required. However, width variation by this method can be achieved only over a limited range. In addition, the side members can be changed over only while the screw press of the extruder is at a standstill because, among other things, several screws have to be undone and then re-tightened after the side members have been fitted.

SUMMARY OF INVENTION

The apparatus described herein in accordance with the invention provides means whereby, without the need for much conversion work, width changes can be carried out simply and quickly over a range of, for example, 800 mm. to 1,800 mm. The standstill time of about three minutes involved in the conversion work can be tolerated in the case of rubber processing machinery, for example, without the material undergoing any substantial change while in the screw extruder.

The improvement over the previously mentioned proposals is the provision of matched pairs of filler slides arranged to slide in the wide extrusion head and to seal it off, these slides being cut away to follow the variations in cross-section of the distributor duct in the extrusion head and being replaced by barrier slides according to the sheet width desired.

Another feature particularly for use in a screw extruder which is movable towards and away from the calender rollers, is the provision of a locking device on each side of the screw extruder, with which devices the filler slides to be changed are temporarily connected after rearward movement of the screw extruder.

The filler slides to be changed should preferably be replaced in the locking devices by barrier slides, these being inserted into those slots in the extrusion head which were originally occupied by the filler slides thus replaced.

BRIEF DESCRIPTION OF THE DRAWINGS

The invention will now be described by way of example only in accordance with the accompanying diagrammatic drawings, in which:

FIGURES 1 and 2 of the drawings show a calender 1 having two contra-rotating rollers 2 and 3.

Figure 1:
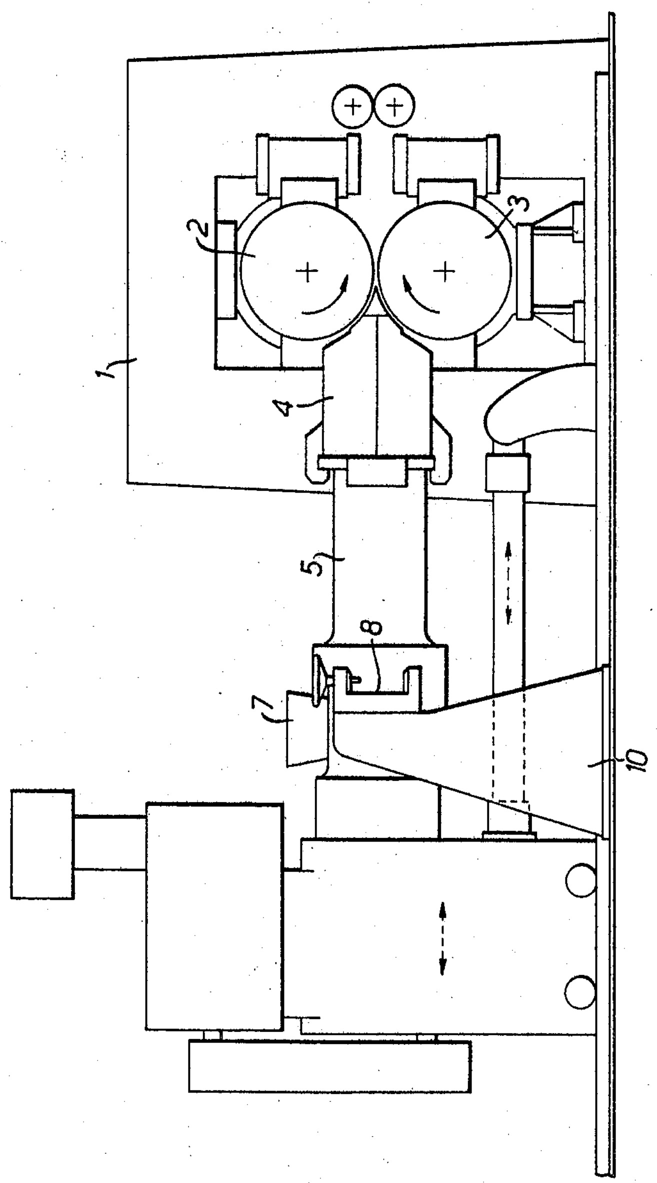
FIGURE 1 is a front view of a screw extruder having a wide extrusion head and associated calender rollers.

Extruded material emerging from a wide extrusion head 4 is delivered into the nip of the two calender rollers 2 and 3. The extrusion head 4 is mounted at the delivery end of a screw extruder 5 which includes a worm 6. The worm 6 conveys the material fed into a charging aperture 7 of the extruder forward to the extrusion head 4.

Figure 2:
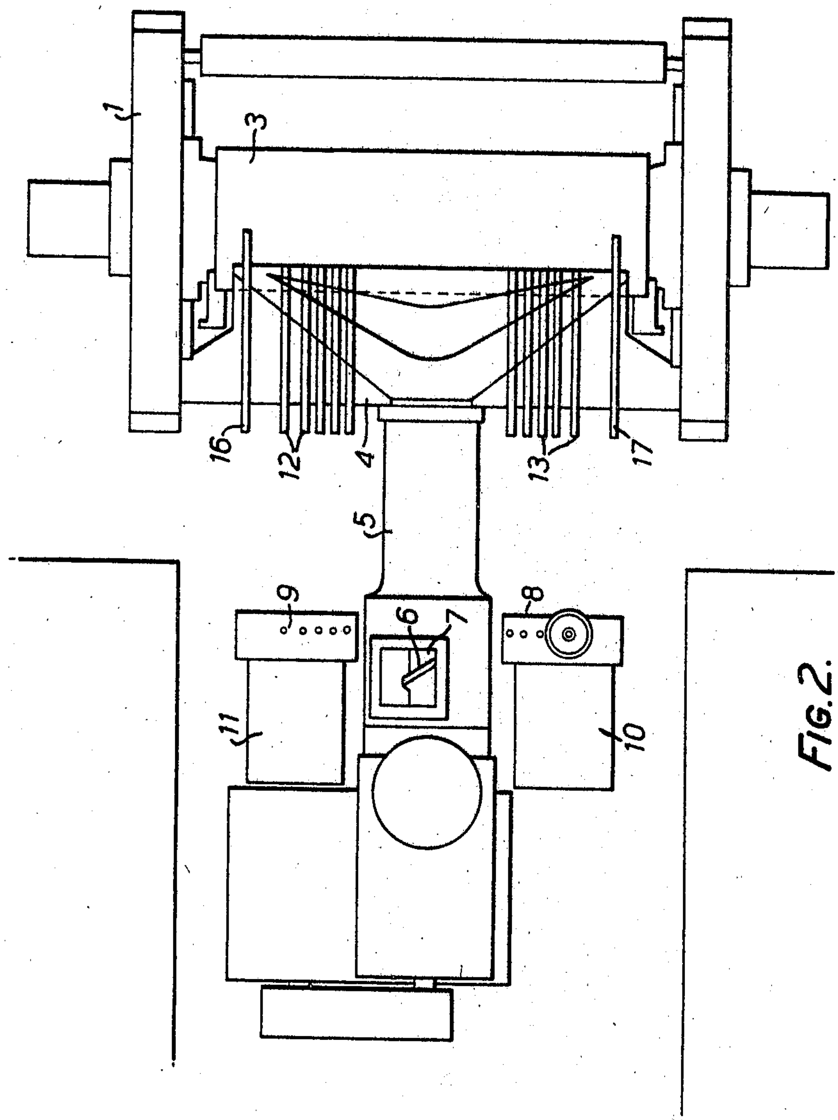
FIGURE 2 is a plan view of the apparatus shown in FIGURE 1.

As can be seen from FIGURES 1 and 2, the screw extruder 5 is movable towards and away from the calender 1.

On both sides of the screw extruder 5 are locking devices 8 and 9 which are supported on the floor of the building containing the extruder by means of stands 10 and 11. The purpose of these locking devices 8 and 9 will be explained in detail hereinafter.

Figure 7:
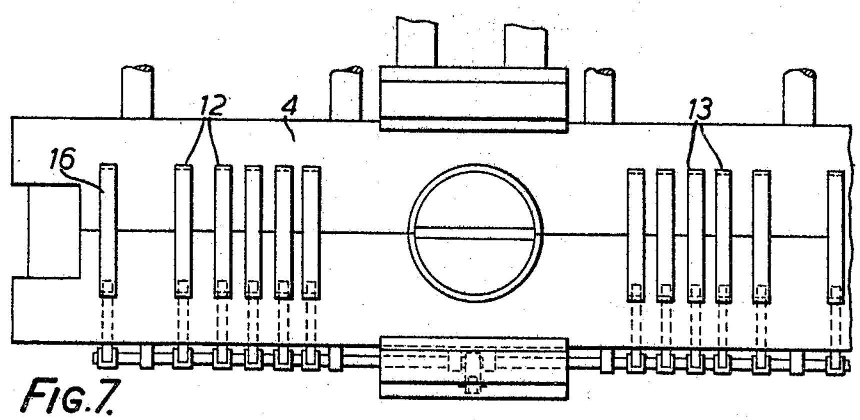
FIGURE 7 is a view taken in the direction of arrow A of FIGURE 4.

Filler slides 12 and 13 (FIGURES 4 and 7), matched in pairs, are arranged to slide in slots 14, 15 formed in the extrusion head 4.

Figures 3, 5, 6:
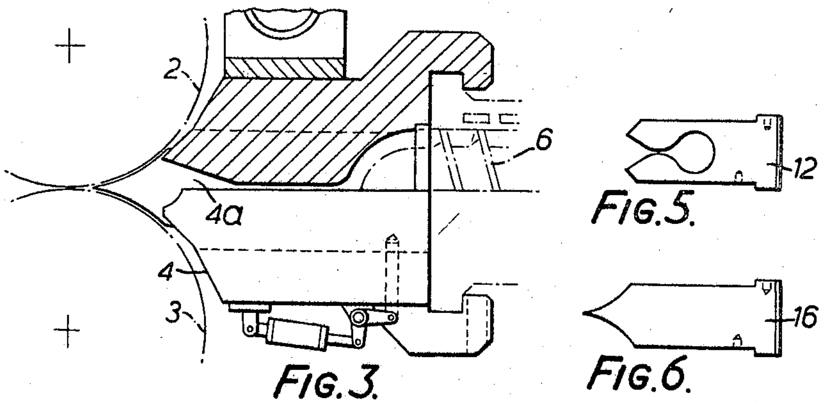
FIGURE 3 drawn to a larger scale, is a part sectional front view of a detail of FIGURE 1 to an enlarged scale.
FIGURE 5 shows a filler slide to a reduced scale in the wide extrusion head of the screw extruder.
FIGURE 6 shows a barrier slide to a reduced scale in the wide extrusion head of the screw extruder.

FIGURE 5 shows a filler slide 12. Each filler slide 12 and 13 has an interior cutout portion matched to the shape of the width of the distributor duct 4*a* at the position at which the slide 12 is to be located. It is important that the wide extrusion head 4 be properly sealed all around, apart from the mouth, notwithstanding the presence of the individual filler slides 12 and 13.

Removable unbroken barrier slides 16, 17 are slidably fitted in slots at the outer ends of the extrusion head 4.

The mode of operation of the screw extruder described herein is as follows:

Let it be assumed that a changeover is to be made (FIGURE 4) from a sheet width B to a sheet width C. For this to be achieved, the screw extruder 5 together with the extrusion head 4 is moved away from the calender 1 until the ends of the filler slides 12 and 13 and the barrier slides 16 and 17 engage in the jaws of the locking devices 8 and 9. The filler slides 12 and 13 to be changed over are thereupon locked and the screw extruder 5 together with the extrusion head 4 is moved towards the calender 1. The two filler slides 12 and 13 to be changed are retained in the locking devices 8 and 9 and thus will not follow this movement.

Next, the two filler slides 12 and 13 are released from the locking devices 8 and 9 and the barrier slides 16 and 17 are placed into and locked in the positions left vacant in the jaws of the locking devices 8 and 9.

Figure 4:
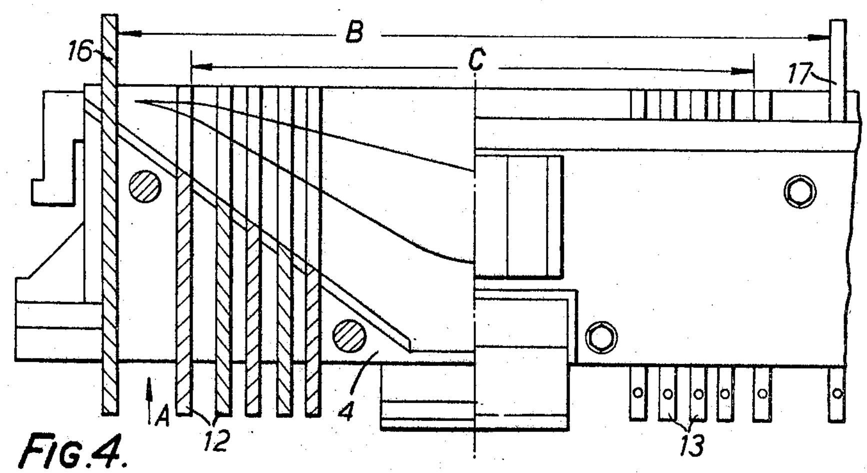
FIGURE 4 is partly a horizontal section and partly a plan view of both to an enlarged scale of the wide extrusion head shown in FIGURE 1.

The screw extruder 5 is then once more moved together with the extrusion head 4 away from the calender 1 whereupon the barrier slides 16 and 17 engage in the slots 14 and 15 left vacant in the extrusion head 4. The barier slides 16 and 17 are now suitably locked to the extrusion head 4. As shown in FIGURE 4, a sheet width C can be obtained upon completion of these manoeuvres.

Any change in sheet width can be similarly obtained by replacing the filler slides concerned with the two barrier slides.

The above described arrangements render it possible to carry out changes in sheet width simply and without extensive, time-consuming conversion work.

We claim:

1. In apparatus for producing lengths of extrudable material, a screw extruder having a charging end and a delivery end, a wide extrusion head at said delivery end, a delivery duct within said extrusion head, a pair of contra-rotating rollers having a nip disposed adjacent said extrusion head to receive extruded material from said delivery duct, and means for varying the width of extruded material discharged from said extrusion head, the improvement being that said means comprises at least one pair of removable filler slides slidable within slots formed in said extrusion head, each slide having a cut-away portion conforming to the local cross-section of the delivery duct of the extrusion head, and that there is provided at least one pair of barrier slides slidable within said slots formed in said extrusion head and operative to replace said filler slides to alter the width of extruded material discharged by said delivery duct.

2. Apparatus according to claim 1 comprising means to permit sliding movement of said screw extruder together with said extrusion head towards and away from said rollers, and locking means for receiving said filler slides as said extrusion head is moved away from said rollers, said locking means being operative to lock said filler slides as said extrusion head is moved towards said rollers to remove said filler slides from said slots in said extrusion head.

3. Apparatus according to claim 2 wherein after said extrusion head has been moved towards said rollers, said filler slides retained by said body means are replaced by said barrier slides, which barrier slides are insertable within said slots formed in said extrusion head as said extrusion head is once more moved away from said rollers.

4. Apparatus according to claim 1 wherein a plurality of pairs of filler slides is provided.

References Cited

UNITED STATES PATENTS

| | | | |
|---|---|---|---|
| 1,020,876 | 3/1912 | Bauer | 18—9 |
| 1,277,729 | 9/1918 | Kearns | 18—9 |
| 2,922,223 | 1/1960 | Boughton et al. | 18—9 XR |
| 3,393,426 | 7/1968 | Meisenberg. | |

WILLIAM J. STEPHENSON, Primary Examiner